United States Patent [19]

Croce

[11] Patent Number: 4,541,176
[45] Date of Patent: Sep. 17, 1985

[54] GLASS CUTTER AND ACCESSORY

[75] Inventor: Charles L. Croce, Revere, Mass.

[73] Assignee: Frank Marzeoti, Burlington, Mass.

[21] Appl. No.: 586,398

[22] Filed: Mar. 5, 1984

[51] Int. Cl.⁴ ............................................. C03B 33/12
[52] U.S. Cl. .................................. 30/164.95; 30/310; 83/886
[58] Field of Search ................ 30/164.95, 310; 83/886

[56] References Cited

U.S. PATENT DOCUMENTS

| | | | |
|---|---|---|---|
| 565,493 | 9/1896 | Miller | 30/164.95 |
| 742,179 | 10/1903 | Fletcher | 30/164.95 |
| 1,375,958 | 4/1921 | Gerdin | 30/164.95 X |
| 1,547,451 | 7/1925 | Scott | 30/164.95 |
| 2,516,668 | 7/1950 | Barrett | 30/164.95 |
| 3,392,445 | 7/1968 | Koran et al. | 30/164.95 |
| 4,044,464 | 8/1977 | Schiess | 30/310 |
| 4,110,907 | 9/1978 | Einhorn et al. | 30/164.95 |
| 4,120,220 | 10/1978 | Mullen | 83/886 |
| 4,215,472 | 8/1980 | Raven | 30/164.95 |
| 4,224,738 | 9/1980 | Magewick et al. | 30/164.95 |
| 4,275,633 | 6/1981 | Littlehorn | 83/886 |
| 4,287,669 | 9/1981 | Arai | 30/164.95 |
| 4,451,981 | 6/1984 | Kaniarz | 30/164.95 X |

Primary Examiner—Jimmy C. Peters
Attorney, Agent, or Firm—Morse, Altman & Dacey

[57] ABSTRACT

A glass cutter and an accessory to allow circular cuts are disclosed. The glass cutter includes a barrel having an axial opening formed of two sections: a smooth and a tapped section, a tapered holder for releasably securing a cutter wheel in the barrel's smooth section, and a spring-biased shaft to be secured within the tapped section and provided with a finger control member. Preferably, the shaft is axially adjustable. Preferably, the barrel has a knurled outer periphery. Preferably, the holder is formed of stainless steel and the remaining parts are of aluminum.

17 Claims, 8 Drawing Figures

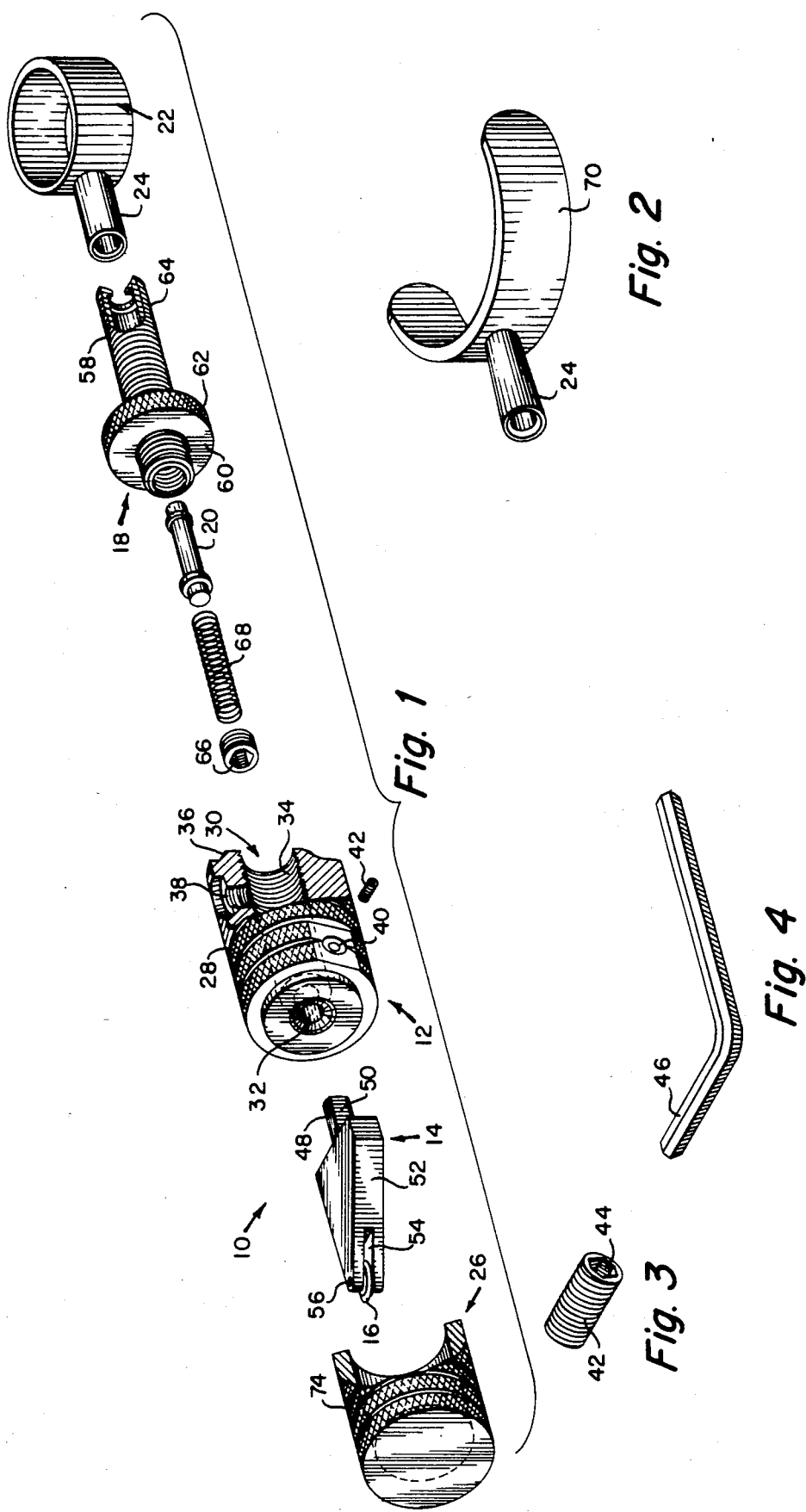

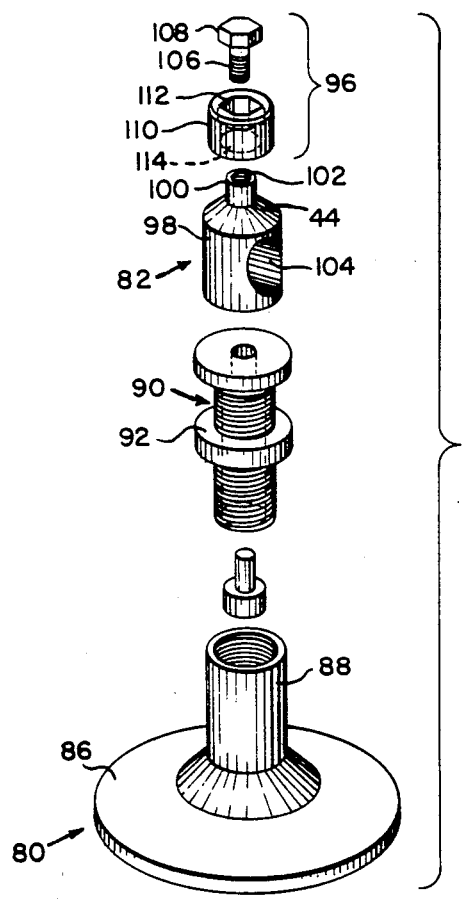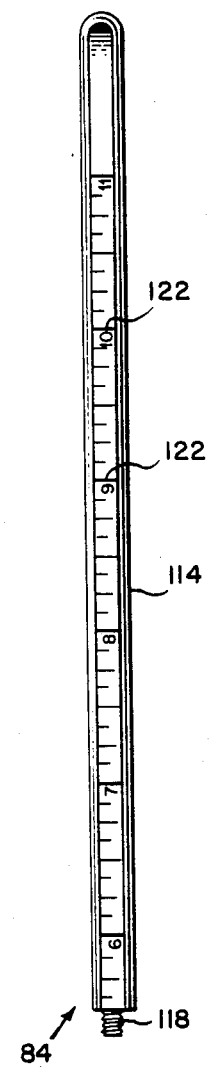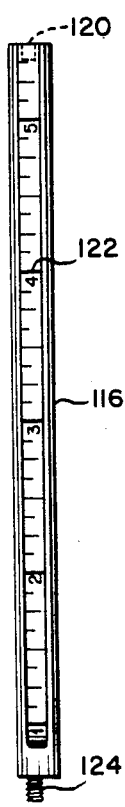
Fig. 5
Fig. 6
Fig. 7

GLASS CUTTER AND ACCESSORY

BACKGROUND OF THE INVENTION

1. Field of the Invention

The present invention relates generally to glass cutters and, more particularly, to a manually operable glass cutter and an accessory thereto.

2. The Prior Art

Manually operable glass cutting tools have been known and in use for many years. Such tools generally comprise an elongated handle having notches formed therein for breaking off narrow pieces of glass after a cut has been made, and a cutting wheel rotatably mounted at one end of the handle. See U.S. Pat. Nos. 565,493 and 742,179. Special tools for cutting glass tubes or rods also have been developed, see U.S. Pat. No. 1,375,958. In precision glass cutting, such as when fitting small pieces of intricate shapes of stained glass together, two factors are of paramount importance: the requirement of maintaining a constant pressure and the requirement of moving the tool by hand in a controlled and precise manner. All the while, it also is important to guard against user's fatigue of the arm, the wrist and more particularly of the fingers. The use of compression springs has been developed to indicate to the user the necessary amount of pressure required for a clean cut in the sheet of glass along the length of the score line. See U.S. Pat. Nos. 2,516,668, 3,392,445 and 4,110,907. As for precisely guiding the cutting tool by hand, one worker in the field suggests the use of a spheroridal hand grip (U.S. Pat. No. 2,516,668), another the use of a tailored grip of high density material together with a contoured palm rest to increase the cutting pressure (U.S. Pat. No. 4,215,472), and still others the use of rings for the index or middle finger (U.S. Pat. Nos. 4,224,738 and 1,547,451).

Although these patents show or suggest some features which may be added to glass cutting tools, there is a need for an improved glass cutter which is capable of providing additional useful features.

SUMMARY OF THE INVENTION

It is a principal object of the present invention to overcome the above disadvantages by providing an improved manually operable glass cutter for cutting small, fine, controlled curves in glass, including stained glass, with minimum of user fatigue.

More specifically, it is an object of the present invention to provide a hand-held glass cutter and an accessory therefor to adapt the cutter for making precise circular cuts. The hand-held glass cutter essentially comprises a barrel member having a through axial opening formed of two sections: a smooth-walled section and a tapped section, a holder for holding a cutter wheel at one end and for being interchangeably secured at the other end within the smooth-walled section, an adjustable-length, spring-loaded shaft member releasably secured within the tapped section, a finger control member rotatably to fit over the free end of the shaft member, and a free-standing oil reservoir member designed to support the cutter and accommodating therein the holder and its cutter wheel. Preferably, the barrel member is provided with a knurled outer periphery to improve grip and finger control of the glass cutter. The accessory to adapt the cutter to circular cuts comprises a flat stand having an integral neck, an adjustable-length bar member to be secured with one end in the neck and having a rotatable head formed with an axial hole and a bore normal thereto, a rod provided with markings of units of length and slidably fitting within the bore, and first means for securing one end of the rod radially in and to the barrel member of the cutter and second means for securing the rod intermediate its ends within the bore. Preferably, at least the holder and the flat stand are formed of stainless steel.

Other objects of the present invention will in part be obvious and will in part appear hereinafter.

The invention accordingly comprises the glass cutter and its accessory of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein:

FIG. 1 is an exploded perspective view of a glass cutter constructed in accordance with the present invention;

FIG. 2 depicts an alternative part of the glass cutter of FIG. 1;

FIG. 3 is a perspective view, on an enlarged scale, of a part of the glass cutter shown in FIG. 1;

FIG. 4 is a fragmentary perspective view of a tool for operating the part of FIG. 3;

FIG. 5 is an exploded perspective view of an accessory for use in conjunction with the glass cutter of FIG. 1; and FIGS. 6 and 7 are perspective views of two segments of an operative part of the accessory of FIG. 5.

DETAILED DESCRIPTION OF THE PREFERRED EMBODIMENT

Figure 8:
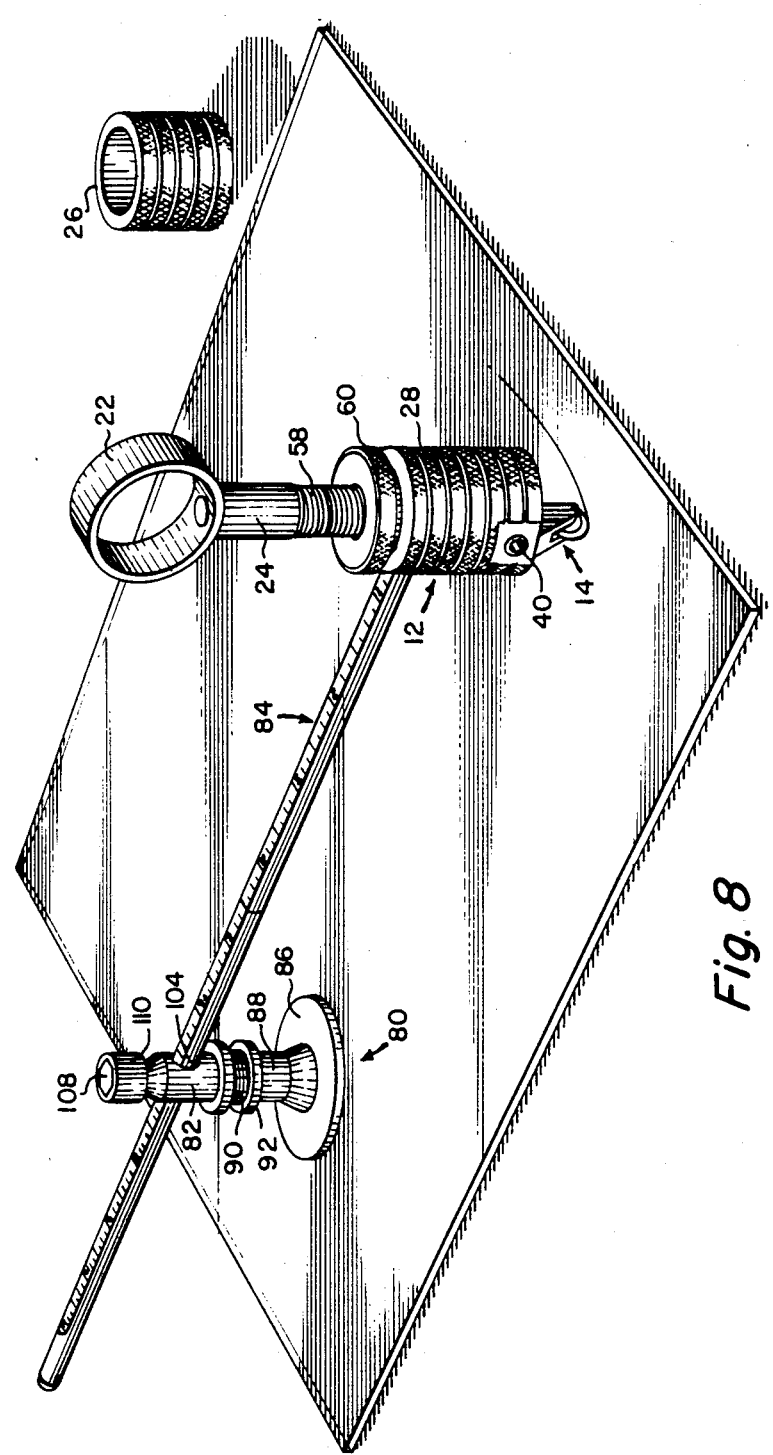
FIG. 8 is a perspective view of the assembled glass cutter of FIG. 1, together with the assembled accessory of FIG. 5, showing them in operative use.

A preferred embodiment of a manually operable glass cutter 10 for effecting small, delicate and precisely controlled cuts in flat sheets of glass of all kinds, including stained glass, constructed in accordance with the present invention is depicted in an exploded perspective view in FIG. 1. The glass cutter 10 excels, in particular, in its free-hand capability.

In general, the glass cutter 10 comprises a barrel member 12, a holder 14 for operatively holding a cutter wheel 16 at one end and being releasably secured to the barrel member 12 at its other end, a shaft member 18 to be secured at one end to the barrel member 12 and featuring a spring-biased shaft 20 at its free end, a finger-control member 22 having a sleeve 24 designed to fit over the spring-biased shaft 20, and a free-standing oil reservoir member 26 designed to support free-standing the glass cutter 10 when not in use and allowing at the same time the cutter wheel 16 thereof to be immersed in lubricating oil contained within the reservoir member 26.

The free-hand capability of the glass cutter 10 of the invention derives, for the most part, from its unique construction. The glass cutter 10 of the invention can be used to cut any flat sheet of glass, including stained glass. To this end, preferably several holders 14 of identical shape and construction are provided, differing only in the specific cutter wheel 16 they respectively hold, namely, a steel cutter wheel, a carbide cutter wheel, a diamond cutter wheel, or any other known or yet to be developed cutter wheel. Preferably, to enhance this interchangeability while preserving long-term usefulness, the holders 14 are formed of stainless steel. The remaining above-enumerated parts of the glass cutter 10 also can be formed of stainless steel. To save on weight and expense, most of these parts also can be formed of other metals, such as aluminum, or of plastics, such as by the well-known injection forming of hard plastics. If desired, some parts can be formed of metal while others can be formed of plastic. Further, different kinds of plastics can be used to form different parts of the glass cutter 10.

As shown in FIG. 1, the barrel member 12 preferably is formed with a knurled outer periphery 28 to facilitate grip and finger control, and with a through axial opening 30. The through axial opening 30 in turn is formed of two sections: a shorter and smaller diameter smooth-walled section 32 adjacent the bottom end of the barrel 12 and a longer, larger diameter tapped section 34, adjacent the other or top end of the barrel member 12. Preferably, the top end of the barrel member 12 is formed with a mound 36 whose significance will become evident from below. There are two perforations 38 and 40 formed radially in the barrel member 12, both being tapped and communicating with the through axial opening 30. One 38 of these two perforations communicating with the tapped section 34, is designed to serve as one anchor for the accessory depicted in FIGS. 5–7 and yet to be described. The other 40 of the two perforations is smaller in diameter and communicates with the shorter smooth-walled section 32. Perforation 40 is designed to accommodate therein a screw 42, shown on an enlarged scale in FIG. 3. Screw 42 is provided with a hexagonal face 44 designed to accommodate therein a hexagonal tool 46, shown also on an enlarged scale in FIG. 4. By inserting the end of the tool 46 into the hexagonal face 44, the screw 42 can be turned so as to advance it further into or to retreat it from the tapped perforation 40, including jutting partially into the smooth-walled section 32.

The holder 14 in turn is provided with a stem 48 designed snugly to fit within the smooth-walled section 32. The stem 48 essentially is circular in right cross section, except that it is provided with a slightly flattened face 50 facing a tapered end 52 of the holder 14. It is this flattened face 50 that the end of the screw 42 is designed to engage, holding thereby the holder 14 firm within the barrel 12. The tapered end 52 is bifurcated by a slot 54. Slot 54 is designed rotatably to mount therein the cutter wheel 16 by means of a pin 56. The tapered end 52 allows the user of the glass cutter 10 a clear, unobstructed view of the score line made by the cutter wheel 16 on the sheet of glass during the actual cutting operation itself. This unobstructed view is of particular significance when cutting small intricate lines, as in stained glass work.

The shaft member 18 comprises an externally-threaded cylinder 58 designed to fit within the tapped section 34 of the barrel 12. The depth of penetration of the cylinder 58 into the tapped section 34 is controlled by a lock nut 60, specifically by the nut 60 abutting against the mound 36. By axially displacing the lock nut 60 along the length of the cylinder 58, the cylinder's penetration into the barrel 12 becomes adjustable. This feature in turn allows adjustment in the overall length of the glass cutter 10 so as to taylor this length to the user's hand. Preferably, the lock nut 60 is of a somewhat lesser diameter than that of the barrel 12 and it also is provided with a knurled peripheral surface 62 to aid the user in its handling.

The externally-threaded cylinder 58 further is designed to accommodate axially and concentrically therein the spring-biased shaft 20. To this end, the cylinder 58 is provided with an axial hole 64 within which the shaft 20 is secured at its lower end by a member 66. The shaft 20, which is hollow to accommodate a compression spring 68, is axially displaceable within the member 66 against the force of the spring 68. This force exerted by the spring 68 is carefully selected according to the work intended to be performed by the glass cutter 10 and may range anywhere from about one to about ten pounds, and preferably is about six pounds for stained glass work.

The finger control member 22, which may be a ring, as shown in FIG. 1 or a yoke 70 as shown in FIG. 2, is designed by its sleeve 24 concentrically to envelope and slidably to fit over almost the entire exposed axial length of the shaft 20, save for a distance 72 of about one-eight of an inch above the cylinder 58. It is the travel over this distance 72 which, when eliminated by pressing the finger-control member 22 down over the shaft 20, determines the proper and constant amount of pressure with which the cutter wheel 16 is held against the sheet of glass being cut.

The glass cutter 10, above described in its detailed construction, when assembled and ready for use, preferably is placed, in a vertically stand up position, into the oil reservoir member 26. Member 26 essentially is a cylinder which is open at the top and closed at its bottom so as to contain therein a predetermined amount of lubricating fluid, such as oil, for the particular cutter wheel 16 used in the glass cutter 10. The external diameter of the reservoir 26 preferably is identical with that of the barrel 12, and its outer periphery 74 also is knurled to facilitate its handling. The depth of the reservoir 26 is slightly in excess of the axial length of the portion of the holder 14 protruding from the bottom of the barrel member 12.

In FIGS. 5–7 is depicted a preferred embodiment of an accessory 80 designed to permit the glass cutter 10 to cut precisely circular or semicircular cuts, of whose radii are selectively adjustable. The accessory 80 essentially comprises two operative parts: an upstanding part 82 depicted in exploded perspective in FIG. 5, and a horizontal part 84, depicted in two segments in FIGS. 6 and 7.

The upstanding part 82 of the accessory 80 comprises a flat stand 86 having a vertical tapped neck 88, an externally-threaded bar 90 provided with the thereon traveling lock nut 92, with the bar 90 designed heightwise adjustably to be received within the tapped neck 88, a head member 94 rotatably mounted at and to the upper end of the bar 90, and first securing means 96 designed to be mounted to the head member 94. The head member 94 is formed with a body portion 98 and a neck portion 100, the latter to accommodate an axial tapped hole 102 and the former a smooth-walled bore 104 formed normal to the hole 102. The first securing means 96 comprises a screw 106 featuring a hexagonal head 108 and a tightening member 110. Tightening member 110 essentially is a cylinder with a countersunk hexagonal depression 112 and a central hole 114. The depth of the depression 112 preferably is more than twice the thickness of the hexagonal head 108 of the screw 106. As a consequence, the tightening member 110 first will have to be raised against gravity to engage the hexagonal head 108 and to turn the same.

The horizontal part 84 of the accessory 80 preferably comprises a pair of segments 114 and 116 designed to mate with each other, as at 118 and 120. Each of the segments 114 and 116 preferably is provided with markings 122 denoting units of length, be it metric, as in centimeters, or English as in inches. The outer diameter of these segments 114 and 116 is such as to fit slidably but not too loosely within the smooth-walled bore 104 of the upstanding part 82. With the proper marking 122 selected, the horizontal part 84 is secured within the bore 104 by means of the first securing means 96. The segment 114 via its protruding screw 118 or the segment 116 via its protruding screw is then linked up with the glass cutter 10 by being screwed thereto in the tapped perforation 38 formed in the barrel member 12.

Thus it has been shown and described a glass cutter 10 of improved construction, together with an accessory 80, which cutter 10 and accessory 80 satisfy the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A glass cutter comprising:
   (a) a barrel member having a through axial opening formed of two sections, one of said two sections being smooth-walled and having a smaller diameter and a shorter axial length than the second tapped section of said two sections:
   (b) a holder formed with a tapered end and a stem for holding a cutter wheel at said tapered end, said stem provided with a tangential flat side facing said tapered end and designed to be received within said smooth-walled section of said barrel member;
   (c) an externally-threaded shaft member provided with a concentric spring-biased shaft and an internally-threaded lock nut meshing with and axially displaceable along said externally-threaded shaft member, said shaft member designed to be received within said tapped section of said barrel member; and
   (d) a finger control member provided with an axially extending sleeve designed to fit over said spring-biased shaft of said shaft member.

2. The glass cutter of claim 1 wherein said barrel member is provided with a knurled periphery and means for securely retaining said stem of said holder within said smooth-walled section.

3. The glass cutter of claim 1 wherein said holder is formed of metal.

4. The glass cutter of claim 3 wherein said metal is stainless steel.

5. The glass cutter of claim 4 wherein all parts save said holder are formed of aluminum.

6. The glass cutter of claim 4 wherein all parts save said holder are formed of hard plastic.

7. The glass cutter of claim 1 further provided with an oil reservoir member having a diameter of about the same size as that of said barrel member and a depth exceeding said tapered end of said holder.

8. The glass cutter of claim 2 wherein said means for retaining said stem within said smooth-walled section comprises a radial tapped hole formed in said barrel member and communicating with said smooth-walled section and an externally-threaded screw displaceable within said radial tapped hole.

9. The glass cutter of claim 8 wherein said externally-threaded screw is provided with a hexagonal-head drive.

10. The glass cutter of claim 1 wherein said finger control member is a ring.

11. The glass cutter of claim 1 wherein said finger-control member is a yoke.

12. An accessory tool for a glass cutter to allow it to cut circular patterns of varying sizes, comprising:
    a flat stand having a vertical tapped neck;
    an externally-thread bar provided with a lock nut and designed to be received within said vertical tapped neck;
    (c) a head member freely rotatable about the free end of said externally-threaded bar and formed with an axial hole and a bore normal to said axial hole;
    (d) a rod provided with markings of units of length and designed slidably to fit within said bore of said head member; and
    (e) means to secure said rod within said bore, said means including a screw designed to fit within said axial hole of said head member and an actuating member designed to rotate said screw and having a normal, free-wheeling position and an operative screw-engaging position.

13. The accessory tool of claim 12 wherein said rod is provided with means by which a glass cutter can be stationarily secured thereto.

14. A combination glass cutter and accessory to permit said cutter to cut circular cuts comprising:
    (a) a barrel member having an axial opening formed of two sections: a smooth-walled section and a tapped section, and a radial opening;
    (b) a holder for holding a cutter wheel and designed to be releasably secured within said smooth walled section;
    (c) a shaft member designed to be secured within said tapped section;
    (d) a finger control membr designed to fit over said shaft member;
    (e) a flat stand having an upstanding neck portion;
    (f) a bar member designed to be received in said upstanding neck portion and provided with a freely rotatable head formed with an axial hole and a bore normal to said hole;
    (g) a rod provided with markings of units of length and designed slidably to fit within said bore; and
    (h) first means to secure one end of said rod within said radial opening of said barrel member and second means to secure said rod within said bore;
    (i) said shaft member being spring biased and designed for axial adjustment with respect to said barrel member.

15. The combination glass cutter and accessory of claim 14 further including a free standing oil reservoir member of a diameter like that of said barrel member and of a depth exceeding the size of said holder.

16. The combination glass cutter and accessory of claim 14 wherein said holder and said flat stand are formed of stainless steel and the remaining parts are formed of aluminum.

17. The combination glass cutter and accessory of claim 14 wherein said barrel has a knurled periphery, said holder is tapered toward said cutter wheel, and said flat stand is circular.

* * * * *